United States Patent [19]

Matsumaru et al.

[11] Patent Number: 5,135,981

[45] Date of Patent: Aug. 4, 1992

[54] METHOD FOR THE PRODUCTION OF METHACRYLIC RESIN MOLDED ITEMS

[75] Inventors: Shigeo Matsumaru, Kawaguchi; Ichiro Soma, Arakawa; Akihiro Mochizuki, Ohmiya, all of Japan

[73] Assignee: Kuraray Co., Ltd., Okayama, Japan

[21] Appl. No.: 555,478

[22] PCT Filed: Dec. 10, 1988

[86] PCT No.: PCT/JP88/01251

§ 371 Date: Aug. 9, 1990

§ 102(e) Date: Aug. 9, 1990

[87] PCT Pub. No.: WO90/06328

PCT Pub. Date: Jun. 14, 1990

[51] Int. Cl.$^5$ .............................................. C08F 299/08
[52] U.S. Cl. ........................................ 524/547; 524/806; 524/837; 526/279; 428/447
[58] Field of Search ............... 524/547, 806, 837; 526/279; 428/447

[56] References Cited

U.S. PATENT DOCUMENTS

| | | | |
|---|---|---|---|
| 3,986,997 | 10/1976 | Clark | 428/412 |
| 4,324,712 | 4/1982 | Vaughn, Jr. | 428/447 |
| 4,324,839 | 4/1982 | Frye | 428/447 |
| 4,442,168 | 4/1984 | White et al. | 428/447 |
| 4,830,803 | 5/1989 | Matsumara et al. | 525/451 |

Primary Examiner—Paul R. Michl
Assistant Examiner—J. McDonald, Jr.
Attorney, Agent, or Firm—Wenderoth, Lind & Ponack

[57] ABSTRACT

The present invention is a method for the production of methacrylic type resin molded items which produces methacrylic type resin molded items having excellent mar resistance, weather resistance, heat resistance and the like by contacting

(A) a preliminary reaction product obtained by polymerizing a composition composed of a hydrolyzate of an alkoxysilane having a (meth)acryloxy group and silica gel to a reaction ratio of 15 to 60, with (B) a base molding material composed of a (meth)acrylic type partially crosslinked gel polymer obtained by mixing (i) a raw resin material selected from the group consisting of an alkyl methacrylate monomer, mixtures of α, β-ethylenically unsaturated monomers containing an alkyl methacrylate as a main component, and a syrup containing polymers thereof with (ii) a crosslink-polymerizable compound having at least two (meth)acryloyloxy groups in a proportion of from 3 to 100 parts by weight of the crosslink-polymerizable compound per 100 parts by weight of the raw resin, and partially polymerizing them in the presence of a polymerization initiator until a gel fraction of from 15 to 50% is reached, when the polymerization is stopped, and polymerizing them under conditions where a desired shape is given.

10 Claims, 1 Drawing Sheet

METHOD FOR THE PRODUCTION OF METHACRYLIC RESIN MOLDED ITEMS

TECHNICAL FIELD

The present invention relates to a method for the production of methacrylic resin molded items, more particularly to a method for the production of methacrylic resin molded items having excellent mar resistance, weather resistance and heat resistance.

BACKGROUND ART

Presently, various synthetic resin molded items are on the market. Among them, (meth)acrylic type resins are used in a wide range of fields regardless of whether they are used outdoors or indoors, such as glazing, covers for lights, ornaments and the like because they have a beautiful external appearance and excellent transparency. However, (meth)acrylic type resins not only have poorer heat resistance than inorganic glass but also have defects in their mar resistance, and if these points are improved, further development of a number of applications will be expected. Accordingly, various methods for the improvement of such defects have hitherto been investigated and proposed.

(1) Prior Arts Relative to Improvement of Mar Resistance

There have been adopted various methods such as a method in which a mar resistant film-forming material is coated by a spraying method, a dipping method or the like on a surface of a molded item obtained from a synthetic molding material by any desired means and thereafter the coated film is polymerized and solidified with electron beams or heat to form a mar resistant film; a method in which a molded item is irradiated with ultraviolet rays in advance and thereafter a mar resistant film is formed; or a method in which a mar resistant film forming material such as a polyfunctional acrylate coated on a mold is prepolymerized and thereafter a basic resin material is poured and polymerized (cf. Japanese Patent Publication (Kokoku) Nos. Sho 53-9876, Sho 54-14617, and Sho 54-14618). However, these methods have problems such as insufficient adhesion between the base resin material and the mar resistant film, and complication of steps.

(2) Prior Arts Relative to Improvement of Heat Resistance

Various methods have been proposed with a view to increasing the heat resistance of the methacrylic type resins. As one of them, there has been proposed a method in which an alkyl methacrylate monomer or syrup is partially crosslink-polymerized to form a gel-like polymer, and a molded item is produced using the gel-like polymer (cf. Japanese Patent Publication (Kokai) No. Sho 60-202128). According to this method, crosslinked molded items having excellent transparency and heat resistance can be obtained but the molded items are crosslinked and thus have a low adhesion with the mar resistant film, resulting in that upon forming a mar resistant film on the surface of the molded item, it is necessary to increase adhesion of the surface of the molded item with the film by conducting a cumbersome pretreatment such as solvent treatment or irradiation of ultraviolet rays. As a solution therefor, the present inventors have proposed a method in which an acrylic mar resistant layer is provided at the same time as the molding (cf. Japanese Patent Publication (Kokai) No. Sho 62-20513). According to this method, adhesion between the film and the surface of the molded item is increased but there arises a problem that the mar resistance decreases upon exposure to ultraviolet rays.

Therefore, it is a main object of the present invention to provide a method for producing easily and at low cost methacrylic type resin molded items which have high mar resistance and high heat resistance and which are excellent in adhesion between the mar resistant film and the base resin material.

DISCLOSURE OF INVENTION

According to the present invention, a method for the production of methacrylic type resin molded items is provided, which method is characterized by:

contacting (A) a preliminary reaction product obtained by polymerizing a composition composed of a hydrolyzate of an alkoxysilane having a (meth)acryloxy group and silica gel to a reaction ratio of 15 to 60, with (B) a base molding material composed of a (meth)acrylic type partially crosslinked gel polymer obtained by mixing (i) a raw resin material selected from the group consisting of an alkyl methacrylate monomer, mixtures of $\alpha$, $\beta$-ethylenically unsaturated monomers containing an alkyl methacrylate as a main component, and a syrup containing polymers thereof with (ii) a crosslink-polymerizable compound having at least two (meth)acryloyloxy groups in a proportion of from 3 to 100 parts by weight of the crosslink-polymerizable compound per 100 parts by weight of the raw resin, and partially polymerizing them in the presence of a polymerization initiator until a gel fraction of from 15 to 50% is reached, when the polymerization is stopped, and polymerizing them under conditions where a desired shape is given.

According to the method of the present invention, heat resistant (meth)acrylic type resin molded items can be obtained which are composed of a crosslinked polymer whose desired portions at least on the surface thereof are firmly covered and bonded with a mar resistant layer.

BEST MODE FOR CARRYING OUT THE INVENTION

Hereafter, the method of the present invention will be explained in greater detail.

(A) Preliminary Reaction Product:

The "hydrolyzate of an alkoxysilane having a (meth)acryloxy group" which can be used as a starting material for producing a mar resistant film in the present invention includes hydrolyzates of a mixture of at least one alkoxysilane represented by the following general formula (I)

wherein $R^1$ is an acryloxy group or a methacryloxy group; $R^2$ is an alkylene group having 1 to 4 carbon atoms, preferably 3 to 4 carbon atoms; $R^3$ is an alkyl group or alkenyl group having 1 to 8 carbon atoms, preferably 1 to 6 carbon atoms, or a phenyl group, provided that when n is 2, two $R^3$s may be same or different; $R^4$ is an alkyl group or alkoxyalkyl group having 1 to 5 carbon atoms, preferably 1 to 4 carbon atoms, provided that when (4-m-n) is 2 or 3, two or three $OR^4$s may be the same or different; n is an integer of from 0 to 2, preferably from 0 to 1; and m is an integer of from 1 to 3, preferably from 1 to 2, provided that $m+n \leq 3$.

Specific examples of the compound of the formula (I) include methacryloxymethyltrimethoxysilane, methacryloxymethyl(methyl)dimethoxysilane, β-methacryloxyethyltrimethoxysilane, β-methacryloxyethyl(methyl)dimethoxysilane, β-methacryloxyethyl(ethyl)dimethoxysilane, γ-methacryloxypropyltrimethoxysilane, γ-methacryloxypropyl(methyl)dimethoxysilane, γ-methacryloxypropyl(vinyl)dimethoxysilane, γ-methacryloxypropyltri(methoxyethoxy)silane, δ-methacryloxybutyltrimethoxysilane, δ-methacryloxybutyl(dimethyl)methoxysilane, and corresponding compounds in which the "methacryloxy groups" in the above-described compounds are replaced by "acryloxy groups".

Among the compounds, those compounds represented by the following general formula (II) are particularly preferred.

wherein X is a hydrogen atom or a methyl group; $R^4$ is an alkyl group or alkoxyalkyl group having 1 to 5 carbon atoms, preferably 1 to 4 carbon atoms, provided that three $OR^4$s may be the same or different.

It is known that the above-described alkoxysilane having a (meth)acryloxy group is readily hydrolyzed when in contact with water or an aqueous solution of an acid; the "hydrolyzate" referred to in the present specification means one in which at least one alkoxy group in the alkoxysilane has been converted into a hydroxyl group by a method known by itself. The hydrolyzate includes one in which a portion of the alkoxysilane has been converted into a state of a polymer by condensation between the resulting hydroxyl groups. However, it is desirable to avoid that the hydrolysis or polymerization should proceed until a state is reached where uniform flowability is lost. The hydrolyzate of alkoxysilane having a (meth)acryloxy group may be prepared by hydrolyzing a mixture of the alkoxysilane with silica sol. In the present invention, it is preferred to obtain a composition of both by this method.

The hydrolyzate of the alkoxysilane having a (meth)acryloxy group may be used singly or as mixtures of two or more thereof. It is preferred that the hydrolyzate of the alkoxysilane having a (meth)acryloxy group be contained in the composition with the silica sol in an amount of usually from 2 to 40% by weight, preferably from 3 to 20% by weight in terms of solid contents. If that amount is below 2% by weight, generally the resin molded items obtained tend to have insufficient adhesion between the cured film and the base resin material. On the other hand, if the amount is above 40% by weight, there is a tendency that the mar resistance becomes insufficient so that good resin molded items cannot be obtained.

As the "silica sol" used in the preparation of the above-described composition, a colloidal dispersion is preferred which is composed of fine particles of silicic anhydride, preferably those having a particle size in the range of 1 to 100 mμ, dispersed in an organic dispersion medium such as water or an alcohol. Those prepared by a known method and put on the market can be used. It is desirable that the silica sol is contained in the composition with the above-described hydrolyzate in an amount of usually from 10 to 70% by weight, preferably from 20 to 65% by weight, in terms of solid content. If that amount is below 10% by weight, generally a tendency is observed that increase of mar resistance (particularly Taber abrasion) of resin molded items is insufficient and weather resistance is poor. On the other hand, if that amount exceeds 70% by weight, peeling off of the coating film upon pre-curing is liable to occur.

In the present invention, the composition of the above-described preliminary reaction product may contain hydrolyzates of other alkoxysilanes in addition to the hydrolyzate of the alkoxysilane having a (meth)alkoxy group and the silica sol. For the purposes of increasing mar resistance, controlling adhesiveness with molds and the like, it is preferred that it contains hydrolyzates of other alkoxysilanes. For example, hydrolyzates of at least one compound represented by the general formula (III) may be used together.

wherein $R^5$ is an alkyl group, a cycloalkyl group, an alkenyl group having 1 to 6 carbon atoms, or a phenyl group, which may be substituted with halogen, amino, epoxy, glycido, glycidyl or mercapto, provided that when l is 2 or 3, two or three $R^5$s may be the same or different; $R^6$ is an alkyl group or an alkoxyalkyl group having 1 to 5 carbon atoms, preferably 1 to 4 carbon atoms, provided that when (4−l) is 2 to 4, two to four $OR^6$s may be the same or different; and l is an integer of from 0 to 3. Examples of the compound of the formula (III) above include trimethylmethoxysilane, dimethyldimethoxysilane, methyltrimethoxysilane, tetra methoxysilane, tetraethoxysilane, tetrabutoxysilane, methyltriethoxysilane, trimethylethoxysilane, phenyltriethoxysilane, vinyltriethoxysilane, vinyl(methyl)triethoxysilane, γ-chloropropyltrimethoxysilane, γ-mercaptopropyltrimethoxysilane, γ-aminopropyltriethoxysilane, N-bis(γ-hydroxyethyl)-γ-aminopropyltriethoxysilane, γ-glycidoxypropyltrimethoxysilane, 3,4-epoxycyclohexylpropyltrimethoxysilane, and the like. These may be selected appropriately depending on the purpose for which the film is modified, for example, depending on the purpose of controlling adhesiveness with the mold, while maintaining the performance of the mar resistant film. They may be hydrolyzed at the same time as the hydrolysis of the silane compound of the formula (I) or they may be hydrolyzed separately and then mixed.

The hydrolyzate of the other alkoxysilane having no (meth)acryloxy group may be contained in the composition of the preliminary reaction product containing the silica sol in an amount of usually from 10 to 88% by weight, preferably from 15 to 70% by weight, in terms of solid content. If the amount of the hydrolyzate used is too large, it is feared that the action of the hydrolyzate of the alkoxysilane having a (meth)acryloxy group in the composition is inhibited, which should desirably be avoided. In the above-described range, the hydrolyzate of the other alkoxysilane may be used in an amount larger than that of the hydrolyzate of the alkoxysilane having a (meth)acryloxy group.

The composition of the hydrolyzate of the alkoxysilane having a (meth)acryloxy group and the silica sol prepared as described above is used as a mar resistant film-forming material for methacrylic resins after subjecting it to preliminary reaction in the present invention. In the present invention, the preliminary reaction is carried out by the condensation polymerization of the alkoxysilane having a (meth)acryloxy group and other alkoxysilane optionally used together until a reaction ratio, defined below, of from 15 to 60, preferably from 17 to 50, is reached. In the polymerization, a portion of the silica sol mixed takes part in the reaction and is chemically bonded to the polymer produced. In the present specification, the "reaction ratio" is a value obtained by dividing the height of the absorption peak near 1,120 cm$^{-1}$ assigned to Si—O by the height of the absorption peak near 3,400 cm$^{-1}$ assigned to O—H, a larger value indicating that curing reaction proceeds to a greater extent and a smaller value indicating that the curing reaction proceeds to a lesser extent.

A molded item having a good adhesion between the mar resistant layer and the base molding material and good external appearance can be obtained by contacting the mar resistant film-forming material, which has been prepared by polymerizing and solidifying in advance the above-described composition until a reaction ratio of 15 to 60, preferably 25 to 50, has been reached before bringing it in contact with the base molding material, with the base resin material and simultaneously polymerizing them under conditions under which a desired shape is given. If the reaction ratio exceeds 60, generally a tendency is observed that adhesion with the base molding material is deteriorated. If the reaction ratio is below 15, cracks tend to occur on the coating film bonded on the molded item.

The preliminary reaction between the above-described hydrolyzate and the silica sol can be carried out, for example, by merely heating the system and removing water, alcohol and the like which are formed out of the system. The heating temperature may be set up generally at from 60° to 130° C., preferably from 80° to 110° C. When the preliminary reaction is carried out at a low temperature or it has to be promoted, usually an acidic or alkaline substance which is known as a curing agent for alkoxysilanes may be added. As the curing agent, there can be cited, for example, ammonium perchlorate, perchloric acid, hydrochloric acid, nitric acid, phosphoric acid, sulfuric acid, sulfonic acid, paratoluenesulfonic acid, boron trifluoride and its complexes with electron donors; Lewis acids and their complexes such as $SnCl_4$, $ZnCl_3$, $FeCl_3$, $AlCl_3$, $SbCl_5$ and $TiCl_4$; metal salts of organic acids such as sodium acetate, zinc naphthenate, cobalt naphthenate, zinc octylate and tin octylate; metal borofluorides such as zinc borofluoride and tin borofluoride; organic borates such as ethyl borate and methyl borate; alkalis such as sodium hydroxide and potassium hydroxide; titanic acid esters such as tetrabutoxytitanium and tetraisopropoxytitanium; metal acetyl-acetonates such as chromium acetylacetonate, titanyl acetyl-acetonate, aluminium acetylacetonate, cobalt acetylacetonate, nickel acetylacetonate, copper acetylacetonate and manganese acetylacetonate; amines such as n-butylamine, di-n-butylamine, tri-n-butylamine, guanidine, biguanide and imidazole; and the like. Among the curing agents, amine type curing agents such as tri-n-butylamine is suitable when molds are at a low temperature. On the other hand, when the temperature of the mold is high, combinations of the amine type curing agent and metal acetylacetonates are particularly preferred.

In the present invention, the preliminary reaction of the above-described composition may be carried out in a solvent. The solvent has a function of facilitating the control of the reaction and also facilitating the application of the composition to the surface of the methacylic type resins. As for the solvent which can be used, there can be cited, for example, alcohols, ketones, ethers, cellosolves, esters, halides, carboxylic acids, aromatic compounds, aliphatic hydrocarbons, and the like. These may be used singly or as mixtures of two or more of them. Among the solvents, particularly preferred are methanol, ethanol, n-propanol, isopropanol, n-butanol, sec-butanol, tert-butanol, cyclohexanol, pentanol, diacetone alcohol, isobutyl methyl ketone, dipropyl ketone, methyl cellosolve, ethyl cellosolve, butyl cellosolve, methyl cellosolve acetate, cellosolve acetate, methyldiacetone ether, cyclohexanone, formic acid, acetic acid, butyric acid, toluene, xylene, ethyl acetate, isobutyl acetate, n-butyl acetate, amyl acetate, pentaacetate, methyl lactate, ethyl acetate, and the like. There is no limitation on the kind and amount of the solvent to be used and appropriate solvents may be selected depending on reaction temperatures and coating methods.

(B) Base Molding Material:

In the molding material (B) composed of the acrylic type partially crosslinked gel polymer used in the present invention, the monomer used as the raw resin material (i) is an alkyl methacrylate monomer alone, or mixtures of an alkyl methacrylate monomer as main component and $\alpha$, $\beta$-ethylenically unsaturated monomers, or a syrup containing polymers thereof. [It should be understood that the term "alkyl" as referred to here includes not only open chain ones but also cyclic ones.] The proportion of alkyl methacrylate in the monomer mixtures may be set up to at least 50% by mole, preferably no lower than 60% by mole, and more preferably from 80% to 100% by mole. Examples of the alkyl methacrylate include methyl methacrylate, ethyl methacrylate, n-propyl methacrylate, isopropyl methacrylate, n-butyl methacrylate, sec-butyl methacrylate, tert-butyl methacrylate, lauryl methacrylate, cyclohexyl methacrylate, and the like. They may be used singly or two or more of them may be used as mixtures. Among them, alkyl methacrylates having 1 to 6 carbon atoms, preferably 1 to 4 carbon atoms, in the alkyl moiety are preferred, with methyl methacrylate being particularly preferred.

Examples of the $\alpha$, $\beta$-ethylenically unsaturated monomers which are copolymerizable with the alkyl methacrylate include alkyl acrylates such as methyl acrylate, ethyl acrylate, propyl acrylate, cyclohexyl acrylate and lauryl acrylate; hydroxyalkyl acrylates such as 2-hydroxyethyl acrylate; hydroxyalkyl methacrylates such as 2-hydroxyethyl methacrylate, 2-hydroxypropyl methacrylate, 4-hydroxybutyl methacrylate, and 2-hydroxy-3-chloropropyl methacrylate; and the like. [As the "alkyl" and "hydroxyalkyl" in the above examples, generally lower ones having 1 to 6 carbon atoms, preferably 1 to 4 carbon atoms, are suitable.]

The syrup containing polymers obtained by partially polymerizing the alkyl methacrylate monomer alone or the monomer mixtures containing the alkyl methacrylate monomer as a main component includes the solution or dispersion in the monomer or the monomer mixture generally having a viscosity of from 1 to 20,000 centipoises, preferably from 100 to 4,000 centipoises, at 25° C. and containing the polymer in an amount of from 3 to 40% by weight, preferably from 6 to 20% by weight, in terms of solid content.

On the other hand, the crosslink-polymerizable compound (ii) used in the present invention is a compound having at least two (meth)acryloyl groups, preferably those having no more than 10 carbon atoms in its chain connecting the two adjacent (meth)acryloyl groups. Examples of the compounds include those represented by the following formula (IV) to (VI) below:

$$MA-O-(CH_2)_n-O-MA \quad (IV)$$

wherein n is an integer of from 3 to 6; and MA represents a methacryloyl group;

$$(M)A-O-CH_2-\underset{\underset{R_2}{|}}{\overset{\overset{R_1}{|}}{C}}-\overset{\overset{R_3}{|}}{CH}-O-(M)A \quad (V)$$

wherein $R_1$ represents H, $CH_3$, $C_2H_5$ or $CH_2OH$; $R_2$ represents H, $CH_3$, $$CH_2OCOC\overset{\overset{R_4}{|}}{=}CH_2$$

(where $R_4$ represents H or $CH_3$), or $CH_2OH$; $R_3$ represents H or $CH_3$; provided that $R_1$, $R_2$ and $R_3$ are not a hydrogen atom simultaneously; and (M)A represents a methacryloyl group or an acryloyl group; and $$(M)AC-(CH_2CH_2O)_n-(M)A \quad (VI)$$

wherein n is 1 or 2; (M)A represents a methacryloyl group or an acryloyl group.

Specific examples thereof include 1,3-propylene glycol dimethacrylate, 1,4-butylene glycol dimethacrylate, 1,6-hexanediol dimethacrylate, 1,3-butylene glycol dimethacrylate, dimethylolethane dimethacrylate, 1,1-dimethylolpropane dimethacrylate, 2,2-dimethylolpropane dimethacrylate, trimethylolethane tri(meth)acrylate, trimethylolpropane tri(meth)acrylate, tetramethylolmethane tri(meth)acrylate, tetramethylolmethane dimethacrylate, ethylene glycol di(meth)acrylate and diethylene glycol di(meth)acrylate. Among them, the compounds belonging to the group represented by the formula (V) are preferred, and 2,2-dimethylolpropane dimethacrylate is particularly preferred.

The blend amount of the crosslink-polymerizable compound is from 3 to 100 parts by weight, preferably from 5 to 50 parts by weight, and most preferably from 5 to 30 parts by weight, per 100 parts by weight of the above-described raw resin material (i).

In the present invention, a polymerization initiator is used when the partially crosslinked gel polymer is prepared and when the thus prepared polymer is brought in contact with the above-described mar resistant film-forming material and polymerized. The polymerization initiator may be one selected from usually used low temperature active polymerization initiators and high temperature active polymerization initiators or mixtures of two or more of them. Generally, the low temperature active polymerization initiators are suitable for the preparation of the partially crosslinked gel polymer, and radical polymerization initiators of peroxide type or azo compound type having a decomposition temperature for a 10 hour half life in the range of no higher than 50° C., preferably from 26° to 45° C., particularly from 26° to 41° C., are suitable.

The amount thereof is generally from 0.002 to 1% by weight, preferably from 0.005 to 0.1% by weight, based on the total amount of the raw resin material (i) and the crosslink-polymerizable compound (ii).

As such low temperature active polymerization initiator, there can be cited, for example, (a) acetylcyclohexylsulfonyl peroxide, isobutyryl peroxide, cumyl peroxyneodecanoate, diisopropyl peroxy-dicarbonate, dimyristyl peroxydicarbonate, 2,2'-azobis(4-methoxy-2,4-dimethylvaleronitrile); (b) diethoxyethyl) peroxydicarbonate, di(methoxyisopropyl) peroxydicarbonate, di-(2-ethylhexyl) peroxydicarbonate, (c) di-(3-methyl-3-methoxybutyl) peroxydicarbonate, t-butyl peroxydecanoate, 2,2'-azobis(2,4-dimethylvaleronitrile) and the like. Among them, the compounds belonging to the groups (a) and (b) are preferred, and particularly preferred are compounds belonging to the group (a).

On the other hand, the high temperature active polymerization initiator is suitable for the polymerization under conditions where the composition is brought in contact with the mar resistant film-forming material and a desired shape is given, and the one whose decomposition temperature is from 60° to 220° C., preferably from 70° to 170° C., is convenient. The amount thereof may be set up generally from 0.02 to 5.0% by weight, preferably from 0.05 to 4% by weight, based on the total amount of the raw resin material (i) and the crosslink-polymerizable compound (ii).

As such high temperature active polymerization initiator, there can be cited, for example, (d) t-butyl cumyl peroxide, diisopropylbenzene hydroperoxide, di-t-butyl peroxide, p-menthane hydroperoxide, 1,1,3,3-tetramethylbutyl hydroperoxide, 2,5-dimethylhexane-2,5-dihydroperoxide, cumene hydroperoxide, t-butyl hydroperoxide, 1,1,2,2-tetraphenylethane-1,2-diol; (e) 1,1-bis(t-butylperoxy)-3,3,5-trimethylcyclohexane, t-butylperoxylaurate, cyclohexanone peroxide, t-butyl peroxyisopropyl carbonate, 2,2-bis(t-butylperoxy)octane, t-butyl peroxyacetate, 2,2-bis(t-butyl-peroxy)butane, t-butyl peroxybenzoate, di-t-butyl diperoxy-isophthalate, methyl ethyl ketone peroxide, a,a'-bis(t-butyl-peroxyisopropyl)benzene, dicumyl peroxide; (f) t-butyl hydroperoxide, m-toluoyl peroxide, benzoyl peroxide, t-butyl peroxy-isobutyrate, octanoyl peroxide, layroyl peroxide, succinic acid peroxide, acetyl peroxide, 1,1'-azobis(cyclohexane-1-carbonitrile), and the like. Among them, preferred are the compounds belonging to the groups (d) and (e), and the compounds belonging to the group (d) are particularly preferred.

In the present invention, the partially crosslinked gel polymer can be prepared by heating a mixture of the above-described raw resin material (i) and the crosslink-polymerizable compound (ii) in the presence of the above-described polymerization initiator. The polymerization is carried out generally at a temperature of from 10° to 80° C., preferably from 35° to 65° C., for from 10 to 200 minutes, preferably from 20 to 150 minutes. When both the low temperature active and high temperature active polymerization initiators are used together, the low temperature active polymerization initiator is consumed almost completely, but the high temperature active polymerization initiator is not decomposed and remains as it is at the above-described reaction temperature and therefore can be used as a polymerization initiator under subsequent molding conditions.

The above-described polymerization reaction stops at the time when the gel fraction of the partially crosslinked gel polymer reaches a value in the range of from 15 to 50%, preferably from 20 to 45%. If the gel fraction is below 15%, foaming upon molding, cracks or deformation of molded items tend to occur readily, and on the other hand if it is above 50%, no sufficient adhesion can be obtained between the base mold material and the mar resistant film-forming material.

The partially crosslinked gel polymerization having a desired gel fraction can be obtained by stopping the polymerization at a desired gel fraction as by rapid cooling or by appropriately selecting the amount of the low temperature active polymerization initiator, polymerization temperature, and polymerization time. Furthermore, it can be obtained with ease by adding a polymerization regulator as described below upon heating the mixture of the above-described raw resin material (i) and the crosslink-polymerizable compound (ii) in the presence of the polymerization initiator.

The polymerization regulator which can be used includes, for example, 1,4(8)-p-menthadiene, 2,6-dimethyl-2,4,6-octatriene, 1,4-p-methadiene, 1,4-cyclohexadiene, α-methylstyrene dimer and the like.

The polymerization regulator may be used in an amount in the range of generally from 0.001 to 0.5% by weight, preferably from 0.001 to 0.2% by weight, and most preferably from 0.005 to 0.1% by weight, based on the total amount of the above-described raw resin material (i) and the crosslink-polymerizable compound (ii).

Preparation of Methacrylic Type Resin Molded Item

In the present invention, the above-described preliminary reaction product (A) and the base molding material composed of acrylic type partially crosslinked gel polymer (B) are brought in contact with each other and polymerized under conditions where a desired shape is given. On this occasion, the preliminary reaction product (A) is allowed to proceed with the polymerization of the acrylic type partially crosslinked gel polymer and at the same time with further condensation polymerization thereof to form a mar resistant film on the surface of the resulting resin molded product. When the preliminary reaction product molded in the form of a film is brought in contact with the crosslinked gel polymer, the composition for the above-described preliminary reaction product does not always have to contain a solvent. On the other hand, when polymerization and molding are carried out by coating the composition on the internal surface of the mold and the like and then introducing the polymer in a state of gel in the mold, the above-described solvents are used in order to obtain a density suitable for coating. It should be noted here that when the mold is at a high temperature, the mar resistant film has a foamed external appearance if the solvent used has a low boiling point, and in order to avoid this foaming, it is particularly desirable to blend the composition for the preliminary reaction product with a solvent which has a boiling point of from 90° to 180° C. and an evaporation rate of from 5 to 150 at 25° C. taking the evaporation rate of n-butyl acetate as 100 ("evaporation rate" as referred to herein means a value obtained by dividing the evaporation time of n-butyl acetate by the evaporation time of a sample solvent concerned and multiplying the resulting value by 100) in an amount of from 20 to 98% by weight, preferably from 40 to 85% by weight, in terms of solvent content. Alternatively, in order to control the reactivity of the composition during the preliminary reaction, water may be added in an amount of from 5 to 30% by weight, preferably from 10 to 20% by weight, in terms of solvent content. In the case where the above-described composition is coated on the film or mold at a relatively low temperature to form a coating film and then heated for polymerization, a solvent having a low boiling point may be used singly or as a mixture with a solvent having a high boiling point. To note, the preliminary reaction product is not always one which has been reacted until a predetermined reaction ratio has been reached before bringing in contact with the partially crosslinked gel polymerization, but it is sufficient that a predetermined reaction ratio has been reached before the polymerization of the gel polymerization is started.

Furthermore, a leveling agent may if desired be added to the composition for the above-described preliminary reaction product for coating in order to increase the coefficient of friction of the surface of the coating film. As the leveling agent, commercially available ones, for example, fluorine-containing surfactants such as F-C-431 (trade name) produced by Sumitomo 3M, silicone type surfactants such as SH-28 (trade name) produced by Toray Silicone, and the like may be used. It is sufficient to add a small amount of the leveling agent. That is, the amount may be usually on the order of from 0.01 to 5% by weight based on the total amount of the composition.

Optionally, deterioration preventing agents such as ultraviolet absorbents and antioxidants, coloring agents such as pigments and dyestuffs, and fillers such as alumina sol, graphite, glass fiber and carbon fiber may be added to the composition for the preliminary reaction for coating.

In the present invention, the mar resistant film-forming material composed of the preliminary reaction product and the base molding material composed of the partially crosslinked gel polymer are polymerized simultaneously in a state where they are in contact with each other. More specifically, the mar resistant film-forming material and at least a portion of the base molding material are brought in contact with each other and polymerized simultaneously so that at least part of the surface of the molded product composed of crosslinked polymer formed from the base molding material can be covered by the polymer layer formed from the mar resistant film-forming material. This polymerization is carried out under conditions under which a molded item having a desired shape can be obtained, for example, by (1) a method in which the mar resistant film-forming material is coated on a mold attached to a compression molding machine, a transfer molding machine, an injection molding machine or the like and heated at from 65° to 110° C. by appropriate means such as brushing, spraying or rolling uniformly in such a manner that there is no foam nor irregularities, so that the mar resistant layer has a thickness of from 0.005 to 0.2 mm, preferably from 0.02 to 0.1 mm, and then polymerized so that the reaction ratio reaches a value in the above-described range, followed by charging the base molding material in the mold and molding it; (2) a method in which the mar resistant material is coated in advance on a film made of a synthetic resin or the like by appropriate means such as by spraying, rolling or the like until the above-described thickness can be obtained, and is heated and polymerized until a desired reaction ratio is reached, followed by mounting the base molding material thereon and charging them in a mold heated at from 80° to 160° C. and molding. On this occasion, the base molding material can be treated in a desired shape such as a sheet, a rod, a block, pellets or the like because it does not pick but has a property of retention of shape.

For the convenience of molding or for other purposes, the base molding material may be ground or kneaded, or if desired, coloring agents and other additives may be blended therewith prior to the molding.

The molding may be carried out by a method in which after completion of clamping the mold at a predetermined temperature, the composition is cured to some extent at a molding pressure within a range in which no flash is formed and on the order of from 15 to 50 kg/cm² and then the pressure is further increased to from 80 to 300 kg/cm² so as to compensate for polymerization shrinkage; a method in which for the purpose of further promoting the reaction, the temperature of the mold is elevated up to 165° C., preferably up to 160° C., during the molding; or the like.

After taking out a molded item from the mold by opening it at the molding temperature or cooling it down to a temperature in accordance with the heat resistance of the base molding material and then opening it, postpolymerization may be carried out at a temperature of generally from 120° to 140° C. for from 3 to 12 hours to obtain a molded item in order to further increase the heat resistance of the base molding material, if desired.

EXAMPLES

Hereafter, the present invention will be explained in greater detail with reference to examples.

The performances of the methacrylic type resin molded items obtained in the examples and comparative examples were measured according to the following methods.

Adhesiveness

Tests were conducted according to JIS Z1522.

Taber Abrasion Test

The abrasion tests were carried out according to ASTM D-1044 under the conditions of using a truck wheel CS-10F, a load of 500 g, and a rotation number of 100 turns.

Steel Wool Test

Tests were carried out using a scratch testing machine produced by Toyo Seiki Seisakusho by employing #000 steel wool on the mar resistant film at a pressure of 100 g/cm² at a transverse speed of 16 mm/sec, and measuring diffused transmission and defining its ratio to total transmission as a haze according to JIS K7105, and further defining the difference between the haze before the test and the haze after the test as mar resistance.

Pencil Hardness

Tests were carried out according to JIS K5400.

Heat Resistance

Tests were carried out according to ASTM D648, and the results were indicated as heat distortion temperature (°C.).

Weather Resistance

Weathering tests were performed for 700 hours using an ultraviolet exposure testing machine (ALTAS-UVCON, produced by Toyo Seiki) by repeating a cycle of standing at 50° C. for 4 hours in a wet state and then only exposing to ultraviolet rays at 70° C. for 8 hours, and mar resistance and external appearance were examined.

Gel Fraction

The base molding material whose weight (x) had been measured in advance was extracted using a Soxhlet extractor for 8 hours in acetone in which a predetermined amount of a polymerization inhibitor was added so that the polymerization reaction of the sample could not occur. Then, the sample was dried and its weight (y) was measured. Gel fraction (%) was defined according to the following formula:

$$\text{Gel Fraction} = \frac{\text{Weight } (y) \text{ After Extraction}}{\text{Weight } (x) \text{ Before Extraction}} \times 100$$

EXAMPLE 1

A mixture of 80 parts by weight of a methyl methacrylate syrup containing 8% by weight of polymethyl methacrylate having a mean degree of polymerization of 8,000, 20 parts by weight of 2,2-dimethylolpropane dimethacrylate, 0.08 g/kg of 1,4(8)-p-menthadiene, 0.03 g/kg of 2,2'-azobis(4-methoxy-2,4-dimethyl)valeronitrile, 0.5 g/kg of di-t-butyl peroxyhexahydroterephthalate, 1 g/kg of 2,2'-bis(t-butyl-peroxy)butane and 3 g/kg of di-t-butyl peroxide, which were mixed and molten, was injected in a cell assembled with two glass plates each having a thickness of 6 mm and an area of 450×350 mm and a gasket made of vinyl chloride resin such that the distance therebetween was 10 mm, and the cell was dipped into a temperature controlled water bath heated at 55° C. in advance and left to stand for 2 hours and 30 minutes for reaction and then taken out therefrom to obtain a partially crosslinked gel polymer having a gel fraction of 33%. The partially crosslinked gel polymer was kneaded using a single screw extruder having a screw diameter of 40φ and L/D=15 to obtain a base molding material.

On the other hand, 14 parts by weight (5 parts by weight in terms of solid content) of γ-methacryloxypropyltrimethoxysilane, 223 parts by weight (45 parts by weight in terms of solid content) of methyltriethoxysilane, 325 parts by weight (50 parts by weight in terms of solid content) of methanol silica sol and 130 parts by weight of isopropyl alcohol were mixed, and while stirring the mixture at a temperature of from 20° to 25° C., 150 parts by weight of 0.02N hydrochloric acid were added dropwise to the mixture. After completion of the dropwise addition, the mixture was left to stand at room temperature for 1 hour for maturation. After adding thereto 6 parts by weight of acetic acid, 140 parts by weight of butyl cellosolve and 512 parts by weight of ethyl cellosolve, 512 parts by weight of low boiling point solvents were recovered from the reaction system under reduced pressure at a temperature no higher than 35° C., followed by adding thereto 10% by weight of deionized water, 0.05% by weight of 1,8-diazabicyclo[5.4.0]undecene-7, and 0.2% by weight of Zn (II) acetylacetonate for preparation. The coating composition thus obtained was a transparent bluish white solution having a solid concentration of 20% by weight and a viscosity of 6 centipoises (20° C.).

The coating composition was spray coated on an internal surface of a cavity of a plate-shaped mold having a projection area of 175×250 mm and attached to a press molding machine having a clamping power of 100 tons so that the resulting mar resistant layer had a thickness of 40 mm, and after leaving to stand for 10 minutes, the base molding material was charged and then the mold was closed immediately, followed by increasing the mold temperature to 135° C. On the other hand, after holding it at a molding pressure of 40 kg/cm$^2$ for 70 seconds, the pressure was increased stepwise to 200 kg/cm$^2$. Then, after maintaining it at the same temperature and pressure for 5 minutes when the temperature reached 135° C., the mold temperature was decreased down to 100° C. and the mold was opened to take out a molded item. Thereafter, post-polymerization was performed at 130° C. for 10 hours using a drier with internal air circulation. Measurements were made on the mar resistance and heat resistance of the molded item, the gel fraction of the base molding material, and the reaction ratio of pre-curing of the coating composition. The results obtained are shown in Table 1.

EXAMPLE 2

A mixture of 95 parts by weight of a methyl methacrylate syrup containing 5% by weight of polymethyl methacrylate having a mean degree of polymerization of 20,000, 5 parts by weight of 2,2-dimethylolpropane dimethacrylate, 0.08 g/kg of 1,4(8)-p-menthadiene, 0.03 g/kg of 2,2'-azobis(4-methoxy-2,4-dimethyl)valeronitrile, 0.5 g/kg of di-t-butyl peroxyhexahydro-terephthalate, 1 g/kg of 2,2'-bis(t-butyl-peroxy)butane and 3 g/kg of di-t-butyl peroxide, which were mixed and molten, was polymerized for 4 hours in the same manner as in Example 1 using two glass plates each having a thickness of 6 mm and an area of 450×350 mm to obtain a partially crosslinked gel polymer having a gel fraction of 36%. The partially crosslinked gel polymer was kneaded using the same single screw extruder as used in Example 1 to obtain a base molding material. On the other hand, after pre-reacting the coating composition obtained in Example 1 for 5 minutes in the same manner as in Example 1, the base molding material was charged in a mold and then the mold was closed immediately, followed by starting the elevation of the mold temperature to 135° C. while holding it at a molding pressure of 40 kg/cm$^2$ for 90 seconds. Thereafter, the pressure was increased stepwise to 200 kg/cm2. Then, after maintaining it at the same temperature and pressure for 15 minutes when the temperature reached 135° C., the mold temperature was decreased down to 100° C. and the mold was opened to take out a molded item. Thereafter, postpolymerization was performed at 130° C. for 10 hours. Measurements were made on the physical properties and performance of the molded item thus obtained and the results obtained are shown in Table 1.

EXAMPLE 3

A mixture of 70 parts by weight of methyl methacrylate, 30 parts by weight of 2,2-dimethylolpropane dimethacrylate, 0.08 g/kg of 1,4(8)-p-menthadiene, 0.03 g/kg of 2,2'-azobis(4-methoxy-2,4-dimethyl)-valeronitrile, 0.5 g/kg of di-t-butyl peroxyhexahydroterephthalate, 1 g/kg of 2,2'-bis(t-butylperoxy)butane and 3 g/kg of di-t-butyl peroxide, which were mixed and molten, was polymerized for 1.5 hours in the same manner as in Example 1 using two glass plates each having a thickness of 6 mm and an area of 450×350 mm to obtain a partially crosslinked gel polymer having a gel fraction of 40%. The partially crosslinked gel polymer was kneaded using the same single screw extruder as used in Example 1 to obtain a base molding material.

On the other hand, after pre-reacting the coating composition obtained in Example 1 for 5 minutes in the same manner as in Example 1, the base molding material was charged in a mold and then the mold was closed immediately, followed by starting the elevation of the mold temperature to 135° C. while holding it at a molding pressure of 50 kg/cm$^2$ for 90 seconds. Thereafter, the pressure was increased stepwise to 200 kg/cm$^2$. Then, after maintaining it at the same temperature and pressure for 10 minutes when the temperature reached 135° C., the mold temperature was decreased down to 120° C. and the mold was opened to take out a molded item. Thereafter, polymerization was performed at 130° C. for 10 hours using a drier with internal air circulation. Measurements were made on the physical properties and performance of the molded item thus obtained and the results obtained are shown in Table 1.

EXAMPLE 4

A mixture of 80 parts by weight of a methyl methacrylate syrup containing 3% by weight of polymethyl methacrylate having a mean degree of polymerization of 23,000, 20 parts by weight of 2,2-dimethylolpropane dimethacrylate, 0.0175 g/kg of cumyl peroxyneodecanoate, 0.5 g/kg of di-t-butyl peroxyhexahydroterephthalate, 1 g/kg of 2,2'-bis(t-butylperoxy)butane and 3 g/kg of di-t-butyl peroxide, which were mixed and molten, was polymerized at 55° C. for 1.5 hours in the same manner as in Example 1 to obtain a partially crosslinked gel polymer having a gel fraction of 50%.

On the other hand, after pre-curing the coating composition obtained in Example 1 for 15 minutes in the same manner as in Example 1, the partially crosslinked gel polymer obtained as above was cut to a size of 175×250 mm and charged in a mold, and then the mold was closed immediately, followed by starting the elevation of the mold temperature to 135° C. while holding it at a molding pressure of 50 kg/cm$^2$ for 45 seconds. Thereafter, the pressure was increased stepwise to 200 kg/cm$^2$. Then, after maintaining it at the same temperature and pressure for 10 minutes when the temperature reached 135° C., the mold temperature was decreased down to 110° C. and the mold was opened to take out molded item. Thereafter, postpolymerization was performed at 130° C. for 10 hours. Measurements were made on the physical properties and performance of the molded item thus obtained and the results obtained are shown in Table 1.

EXAMPLE 5

A mixture of 80 parts by weight of a methyl methacrylate syrup containing 4% by weight of polymethyl methacrylate having a mean degree of polymerization of 8,000, 20 parts by weight of 2,2-dimethylolpropane dimethacrylate, 0.08 g/kg of 1,4(8)-p-menthadiene, 0.03 g/kg of 2,2'-azobis (4-methoxy-2,4-dimethyl)valeronitrile, 0.5 g/kg of di-t-butyl peroxyhexahydro-terephthalate, 1 g/kg of 2,2'-bis(t-butyl-peroxy)butane and 3 g/kg of di-t-butyl peroxide, which were mixed and molten, was polymerized for 1.5 hours in the same manner as in Example 1 to obtain a partially crosslinked gel polymer having a gel fraction of 15%. The partially crosslinked gel polymer was kneaded using the same single screw extruder as used Example 1 to obtain a base molding material.

On the other hand, after coating the coating composition obtained in Example 1 on a 200 m-thick polyethylene glycol terephthalate film to a thickness of 75 mm using an applicator and pre-curing at 110° C. for 15 minutes using a drier with internal air circulation, the film cut to a size of 175×200 mm was set in a mold attached to a press molding machine in the same manner as in Example 1 so that the base molding material and the coating film were in contact with each other, followed by charging the base molding material in the mold and molding in the same manner as in Example 1 to obtain a molded item. Then, the molded item was taken out and postpolymerization was performed at 130° C. for 10 hours. Measurements were made on the physical properties and performance of the molded item thus obtained and the results obtained are shown in Table 1.

COMPARATIVE EXAMPLE 1

By repeating the same procedures as in Example 1 except that the polymerization time for obtaining the partially crosslinked gel polymer was changed to 1 hour, a similar polymer having a gel fraction of 10% was obtained. A molded item was obtained in the same manner as in Example 1. However, wrinkles occurred on the surface and also cracks occurred, thus failing to give the objective molded item. The results obtained are shown in Table 1.

COMPARATIVE EXAMPLE 2

The same procedures as in Example 4 were repeated except that the polymerization time for obtaining the partially crosslinked gel polymer was changed to 2 hours to obtain a molded item. This showed insufficient adhesion between the mar resistant layer and the base molding material. The results obtained are shown in Table 1.

EXAMPLE 6

A mixture of 80 parts by weight of a methyl methacrylate syrup containing 4.5% by weight of polymethyl methacrylate having a mean degree of polymerization of 20,000, 20 parts by weight of 2,2-dimethylolpropane dimethacrylate, 0.08 g/kg of 1,4(8)-p-menthadiene, 0.03 g/kg of 2,2'-azobis(4-methoxy-2,4-dimethyl)valeronitrile, 0.5 g/kg of di-t-butyl peroxyhexahydro-terephthalate, 1 g/kg of 2,2'-bis(t-butyl-peroxy)butane and 3 g/kg of di-t-butyl peroxide, which were mixed and molten, was polymerized for 2.5 hours in the same manner as in Example 1 to obtain a partially crosslinked gel polymer having a gel fraction of 36%. The partially crosslinked gel polymer was kneaded using the same single screw extruder as used in Example 1 to obtain a base molding material.

On the other hand, molding was carried out in the same manner as in Example 1 except that a coating composition was used which had the same composition as that used in Example 1 except that the solid contents were composed of 75 parts by weight of methyltriethoxysilane, 19 parts by weight of methanol silica sol and 6 parts by weight of γ-methacryloxypropyltrimethoxysilane and occupying 20% by weight based on the total weight, and that the time of pre-curing was 5 minutes. After taking out the product, post-polymerization was carried out at 130° C. for 10 hours to obtain a molded item. Measurements were made on the physical properties and performance of the molded item thus obtained and the results obtained are shown in Table 1.

EXAMPLE 7

Molding and post-polymerization were carried out in the same manner as in Example 1 using the same coating composition except that the blend of the coating composition was changed to 64% of methyl-triethoxysilane, 16% methanol silica sol, and 20 parts by weight of γ-methacryloxypropyltrimethoxysilane and using the same pre-curing conditions except that the time was changed to 20 minutes. Measurements were made on the physical properties and performance of the molded item thus obtained and the results obtained are shown in Table 1.

EXAMPLE 8

Molding and post-polymerization were carried out under the same conditions as in Example 1 using a coating composition having the same composition as that used in Example 1 except that Zn (II) acetylacetonate was added in an amount of 0.1% by weight and no deionized water was added and using the same base molding material as that used in Example 6 to obtain a molded item. Measurements were made on the physical properties and performance of the molded item thus obtained and the results obtained are shown in Table 1.

EXAMPLE 9

Using a base molding material obtained by the same method as in Example 6 and a coating composition having the same formulation as that of Example 1 and also using the same molding machine and mold as those used in Example 1, the coating composition was spray coated on the mold heated at 100° C. in advance, and pre-cured for 2 minutes. Thereafter, the base molding material was charged in the mold and the mold was clamped immediately, followed by starting the elevation of the mold temperature to 135° C. while holding it at a molding pressure of 50 kg/cm$^2$ for 85 seconds. Thereafter, the pressure was increased stepwise to 200 kg/cm$^2$. Then, after maintaining it at the same temperature and pressure for 15 minutes when the temperature reached 135° C., the mold temperature was decreased down to 100° C. and the mold was opened to take out a molded item. Thereafter, post-polymerization was performed at 130° C. for 10 hours. Measurements were made on the physical properties and performance of the molded item thus obtained and the results obtained are shown in Table 1.

Figure 1:
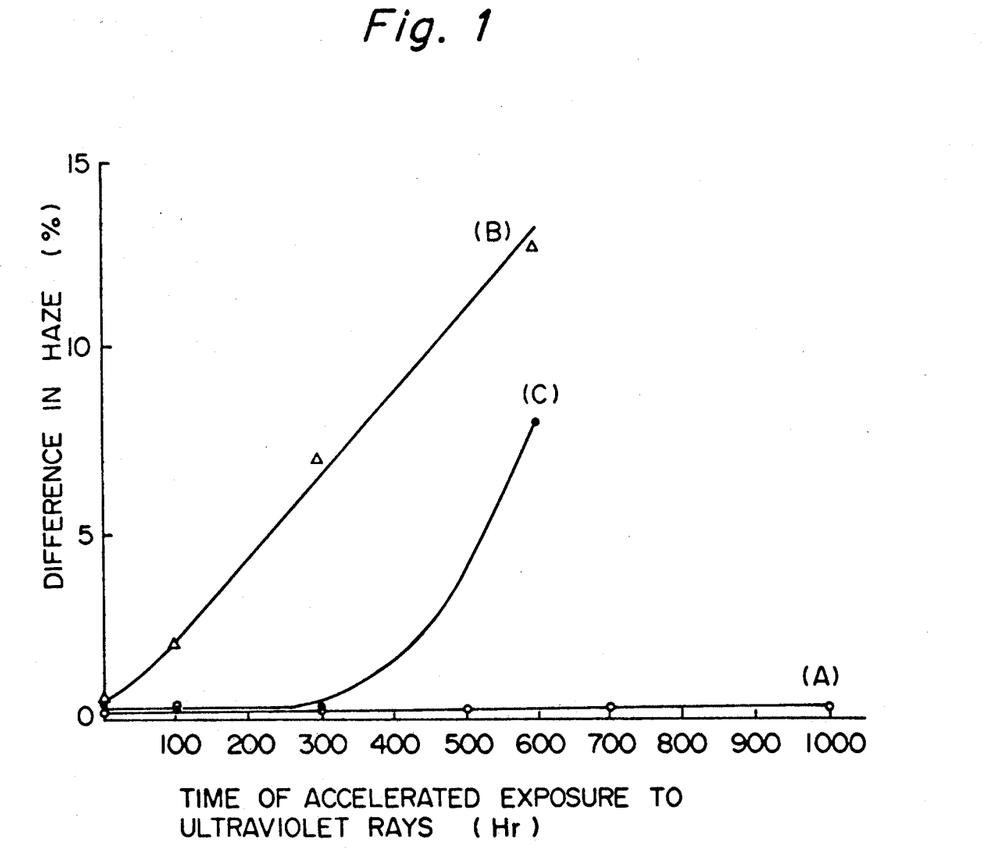
FIG. 1 is a graph plotting time of exposure to ultraviolet rays of (A) a molded item obtained according to the method of the present invention, (B) a commercially available mar resistant plate provided with an acrylic type mar resistant layer at the same time as the molding, and (C) a methacrylic type resin molded item provided with an acrylic type mar resistant layer at the same time as the molding, against difference in haze thereof obtained by steel wool tests.

EXAMPLE 10 ultraviolet rays. The results obtained are illustrated in FIG. 1.

TABLE 1

| Example | | Reaction Ratio of Coating Composition | Gel Fraction of Base Resin Material (%) | Pencil Hardness | Steel Wool Test | Taber Abrasion Test | Adhesion | Heat Resistance | Remarks |
|---|---|---|---|---|---|---|---|---|---|
| Example | 1 | 33 | 33 | 6 H | 0.1 | 0.8 | 100/100 | 139 | |
| | 2 | 25 | 36 | 5 H | 0.2 | 1.2 | 100/100 | 118 | |
| | 3 | 33 | 40 | 6 H | 0.1 | 1.0 | 100/100 | 145 | |
| | 4 | 40 | 50 | 6 H | 0.1 | 0.6 | 100/100 | 140 | |
| | 5 | 50 | 15 | 6 H | 0.3 | 0.8 | 100/100 | 137 | |
| | 6 | 29 | 36 | 5 H | 1.3 | 2.4 | 100/100 | 138 | |
| | 7 | 44 | 36 | 5 H | 2.2 | 5.1 | 100/100 | 139 | |
| | 8 | 40 | 36 | 6 H | 0.4 | 1.5 | 100/100 | 140 | |
| | 9 | 17 | 36 | 5 H | 0.8 | 2.8 | 100/100 | 139 | |
| | 10 | 50 | 36 | 6 H | 0.1 | 0.5 | 100/100 | 138 | |
| Comparative Example | 1 | 33 | 10 | — | — | — | — | — | Cracks and wrinkles occurred in the molded item |
| | 2 | 40 | 55 | 5 H | — | — | 70/100 | — | |
| | 3 | 10 | 36 | — | — | — | — | — | Cracks occurred in the coating film |
| | 4 | 67 | 36 | — | — | — | 50/100 | — | |
| | 5 | 17 | 36 | — | — | — | 85/100 | — | |

In Example 9, the pro-curing time for coating composition was changed to 30 minutes and a molding item was obtained in the same manner as in Example 9. Measurements were made on the physical properties and performance of the molded item thus obtained and the results obtained are shown in Table 1.

COMPARATIVE EXAMPLE 3

In Example 9, the pre-curing time for the coating composition was changed to 1 minute and a molding item was obtained in the same manner as in Example 9. This showed the occurrence of cracks on its surface and was not fit for use.

COMPARATIVE EXAMPLE 4

In Example 9, the pre-curing conditions for the coating composition were changed to 110° C. for 40 minutes, and a molded item was obtained in the same manner as in Example 9. The molded item had no defect in its external appearance but lacked sufficient adhesion between the base molding material and the coating film.

COMPARATIVE EXAMPLE 5

The same molding as in Example 9 was performed using the same base molding material as Example 6 and the same coating composition as that used in Example 1 except that the blend ration of the solid contents was changed to 80 parts by weight of methyltriethoxysilane and 20 parts by weight of methanol silica sol to obtain a molded item. The molded item had no defect in its external appearance but lacked sufficient adhesion between the base molding material and the coating film.

COMPARATIVE EXAMPLE 11

Molded item (A) obtained in Example 1, mar resistant plate (B) provided with an acrylic type mar resistant layer in the same manner as commercially available molded item, and methacrylic type resin molded item (C) obtained according to Example 21 of Japanese Patent Publication (Kokai) No. Sho 62-20513 which was provided with an acrylic type mar resistant layer at the same time as the molding were measured for their differences in haze by steel wool tests to show variation with time of mar resistance against time of exposure to ultraviolet rays. The results obtained are illustrated in FIG. 1.

The above-described examples, Table 1 and FIG. 1 show that molded items having very excellent adhesion and mar resistance and a good heat resistance were obtained which have the following features.

(1) When the gel fraction of the base molding material was 10% or 55%, wrinkles, cracks and adhesion failure occurred in the molded item. In examples other than described above in which the gel fraction was in the range of from 15 to 50%, molded items were obtained at the same time as the molding which were all very excellent in external appearance, adhesion, mar resistance and heat resistance.

(2) When the reaction ratio of the coating composition was 10 or 67, cracks and adhesion failure occurred in the coating film. However, in Examples other than described above in which the reaction ratio was in the range of from 17 to 50, molded items were obtained at the same time as the molding which were all very excellent in external appearance, adhesion, mar resistance and heat resistance.

(3) As for the mar resistance after weathering testing as durability, as shown in FIG. 1, the molded item according to the examples of the present invention showed substantially no decrease in the mar resistance against time of exposure to ultraviolet rays as compared with the commercially available acrylic resin plate provided with mar resistance at the same time as the molding (B) and the methacrylic type resin molded item (C) provided with an acrylic type mar resistant layer at the same time as the molding.

INDUSTRIAL APPLICABILITY

As described above, the present invention can give rise to methacrylic type resin molded items showing very good adhesion between the base molding material and the mar resistant layer and having an excellent mar resistance and a heat resistance with less variation in mar resistance upon exposure, by contacting (A) a mar resistant film-forming material obtained by polymerizing and solidifying a composition composed of a hydrolyzate of an alkoxysilane having a (meth)acryloxy group and silica gel to a reaction ratio of 15 to 60 in advance prior to bringing it into contact with a base molding material, with (B) a base molding material composed of a (meth)acrylic type partially crosslinked gel polymer obtained by mixing (i) a raw resin material selected from the group consisting of an alkyl methacrylate monomer, mixtures of the alkyl methacrylate as a main component with α,β-ethylenically unsaturated monomers, and a syrup containing polymers thereof with (ii) a crosslink-polymerizable compound having at least two (meth)acryloyloxy groups in a proportion of from 3 to 100 parts by weight of the crosslink-polymerizable compound per 100 parts by weight of the raw resin material, and partially polymerizing them in the presence of a polymerization initiator until a gel fraction of from 15 to 50% is reached, when the polymerization is stopped, and polymerizing them under conditions where a desired shape is given. Because the polymerization is performed at the same time as the molding, fabrication steps can be simplified, thus making it possible to provide the molded items with ease and at low cost.

Therefore, the molded items according to the present invention can be used in fields where such performances as weather resistance, mar resistance and heat resistance are required, for example, in head lamp lenses, lamp covers, meter covers for motorcycles, solar energy hot water supplier, and the like.

We claim:

1. A method for the production of methacrylic type resin molded items, which method comprises:
contacting
(A) a preliminary reaction product obtained by polymerizing a composition composed of a hydrolyzate of an alkoxysilane having a (meth)acryloxy group and silica gel to a reaction ratio of 15 to 60, with
(B) a base molding material composed of a (meth)acrylic type partially crosslinked gel polymer obtained by mixing (i) a raw resin material selected from the group consisting of an alkyl methacrylate monomer, mixtures of α,β-ethylenically unsaturated monomers containing an alkyl methacrylate as a main component, and a syrup containing polymers thereof with (ii) a crosslink-polymerizable compound having at least two (meth)acryloyloxy groups in a proportion of from 3 to 100 parts by weight of the crosslink-polymerizable compound per 100 parts by weight of the raw resin, and partially polymerizing them in the presence of a polymerization initiator until a gel fraction of from 15 to 50% is reached, when the polymerization is stopped, and
polymerizing them under conditions where a desired shape is given.

2. A method as claimed in claim 1, wherein said preliminary reaction product is a preliminary reaction product of a composition composed of the hydrolyzate of the alkoxysilane having a (meth)acryloxy group, the silica sol and a hydrolyzate of another alkoxysilane.

3. A method as claimed in claim 1, wherein said alkoxysilane having a (meth)acryloxy group is methacryloxypropyl-trimethoxysilane.

4. A method as claimed in claim 1, wherein the alkyl group in said alkyl methacrylate has from 1 to 4 carbon atoms.

5. A method as claimed in claim 4, wherein said alkyl methacrylate is methyl methacrylate.

6. A method as claimed in claim 1, wherein said crosslink-polymerizable compound is a compound represented by general formula below:

wherein $R_1$ represents H, $CH_3$, $C_2H_5$ or $CH_2OH$; $R_2$ represents H, $CH_3$, (where $R_4$ represents H or $CH_3$), or $CH_2OH$; $R_3$ represents H or $CH_3$; provided that $R_1$, $R_2$ and $R_3$ are not a hydrogen atom simultaneously; and (M)A represents a methacryloyl group or an acryloyl group.

7. A method as claimed in claim 6, wherein said crosslink-polymerizable compound is 2,2-dimethylolpropane dimethacrylate.

8. A method as claimed in claim 1, further comprising coating a mar resistant layer forming composition on a mold for molding in advance, polymerizing the composition until a desired reaction ratio is reached, introducing the base molding material in the mold, and molding it.

9. A method as claimed in claim 1, further comprising coating in advance a mar resistant layer forming composition on a film made of a synthetic resin, polymerizing the composition until a desired reaction ratio is reached, and then mounting the base molding material thereon and charging them in a mold, and molding them.

10. A method as claimed in claim 2, wherein said alkoxysilane having a (meth)acryloxy group is methacryloxypropyl-trimethoxysilane.

* * * * *